US010469598B2

(12) United States Patent
Edgington et al.

(10) Patent No.: US 10,469,598 B2
(45) Date of Patent: Nov. 5, 2019

(54) CONTINUOUS COGNITIVE CLOUD SERVICE MAXIMIZATION

(71) Applicant: International Business Machines Corporation, Armonk, NY (US)

(72) Inventors: Jeff Edgington, Keller, TX (US); Kristina E. Jones, Dallas, TX (US); Hung Tack Kwan, Grand Prairie, TX (US); Shiju Mathai, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 15/335,516

(22) Filed: Oct. 27, 2016

(65) Prior Publication Data

US 2018/0124187 A1     May 3, 2018

(51) Int. Cl.
*G06F 15/16* (2006.01)
*H04L 29/08* (2006.01)
*H04L 12/24* (2006.01)

(52) U.S. Cl.
CPC .............. *H04L 67/16* (2013.01); *H04L 41/50* (2013.01); *H04L 41/5096* (2013.01); *H04L 67/10* (2013.01); *H04L 41/5032* (2013.01); *H04L 41/5038* (2013.01); *H04L 41/5058* (2013.01); *H04L 41/5067* (2013.01)

(58) Field of Classification Search
CPC . H04L 41/50; H04L 41/5032; H04L 41/5038; H04L 41/5058; H04L 41/5096; H04L 67/10; H04L 67/16

USPC ......................................................... 709/223
See application file for complete search history.

(56) References Cited

U.S. PATENT DOCUMENTS

| 8,959,076 | B2 | 2/2015 | Herger et al. |
| 2008/0244526 | A1* | 10/2008 | Chang ................. G06F 11/3447 717/127 |
| 2015/0286708 | A1* | 10/2015 | Tao ....................... G06F 16/334 707/730 |

* cited by examiner

*Primary Examiner* — Normin Abedin
(74) *Attorney, Agent, or Firm* — Steven M. Greenberg, Esq.; Shutts & Bowen LLP

(57) ABSTRACT

Embodiments of the invention include a method, system and computer program product for the continuous cognitive discovery and management of cloud services in an aggregated distributed application. One method includes receiving a textual specification of cloud service criteria, searching a registry for cloud services corresponding to the textual specification and presenting locating cloud services corresponding to the textual specification. Thereafter, the located cloud services are ranked and presented and one or more of the presented cloud services are selected for deployment and deployed as part of an aggregated distributed application. Thereafter, the registry is searched to locate and rank new cloud services based upon the textual specification, and in response to determining that one of the new cloud services is ranked higher than an existing one of the cloud services already deployed, the determined one of the new cloud services is deployed into the aggregated distributed application.

12 Claims, 3 Drawing Sheets

CONTINUOUS COGNITIVE CLOUD SERVICE MAXIMIZATION

BACKGROUND OF THE INVENTION

Field of the Invention

The present invention relates to cloud services and more particularly to locating and arranging cloud services into an application.

Description of the Related Art

Cloud based services represent the leading edge of distributed computing and are viewed as the foundation for developing a truly universal model for supporting the rapid development of component-based applications over the World Wide Web. Cloud based services are known in the art to include a stack of emerging standards that describe a service-oriented, component-based application architecture. Specifically, cloud based services, also known more simply as "cloud services", are loosely coupled, reusable software components that semantically encapsulate discrete functionality and are distributed and programmatically accessible over standard Internet protocols.

Conceptually, cloud services represent a model in which discrete tasks within processes are distributed widely throughout a value net. Notably, many industry experts consider the service-oriented cloud services initiative to be the next evolutionary phase of the Internet. Typically, cloud services services can be defined by an interface such as the open cloud computing interface (OCCI), and can be implemented according to the interface, though the implementation details matter little so long as the implementation conforms to the interface. Once a cloud service has been implemented according to a corresponding interface, the implementation can be registered with a registry. Upon registration, the cloud service can be accessed by a service requestor through the use of any supporting messaging protocol, including for example, the simple object access protocol (SOAP) or by way of representational state transfer (REST).

BRIEF SUMMARY OF THE INVENTION

Embodiments of the present invention address deficiencies of the art in respect to cloud service location and aggregation and provide a novel and non-obvious method, system and computer program product for the continuous cognitive discovery and management of cloud services in an aggregated distributed application. In an embodiment of the invention, a method for the continuous cognitive discovery and management of cloud services in an aggregated distributed application includes receiving in a user interface to a cloud services manager, a textual specification of cloud service criteria and searching a registry for cloud services corresponding to the textual specification and presenting in the user interface locating cloud services corresponding to the textual specification. Thereafter, the located cloud services are ranked and presented in the user interface. Then, one or more of the cloud services presented in the user interface are selected for deployment and the selected cloud services are deployed as part of an aggregated distributed application. Finally, subsequent to the deployment of the selected cloud services, the registry is searched to locate new cloud services based upon the textual specification, the located new cloud services are ranked, and in response to a determination that one of the located new cloud services is ranked higher than an existing one of the cloud services already deployed as part of the aggregated distributed application, the determined one of the new cloud services is deployed into the aggregated distributed application.

In one aspect of the embodiment, the determined one of the new cloud services is deployed into the aggregated distributed application in substitute for the existing one of the cloud services. Alternatively, the determined one of the new cloud services is deployed into the aggregated distributed application in supplement to the existing one of the cloud services. In another aspect of the embodiment, the ranking is based upon crowdsourced feedback of quality of service (QoS) from different users of the cloud services. In yet another aspect of the embodiment, the ranking for a corresponding one of the cloud services is based upon a measured result of simulated performance of the corresponding one of the cloud services. Finally, in even yet another aspect of the embodiment, the searching of the registry to locate new cloud services based upon the textual specification, and the ranking of the located new cloud services occurs continuously.

In another embodiment of the invention, a data processing system is configured for the continuous cognitive discovery and management of cloud services in an aggregated distributed application. The system includes a host computing platform with one or more computers, each with memory and at least one processor. The host computing platform is communicatively coupled over a computer communications network to multiple different repositories of different cloud services and also to at least one registry of the different cloud services. The system yet further includes a cloud services management module executing in the memory of the host computing platform.

The module includes program code enabled during execution in the memory of the host computing platform to receive in a user interface to the module a textual specification of cloud service criteria, search the registry for cloud services corresponding to the textual specification and presenting in the user interface locating cloud services corresponding to the textual specification, rank the located cloud services and present the rankings for the located cloud services in the user interface, select one or more of the cloud services presented in the user interface for deployment and and deploy the selected cloud services as part of an aggregated distributed application, and, subsequent to the deployment of the selected cloud services, search the registry to locate new cloud services based upon the textual specification, rank located new cloud services, and respond to a determination that one of the located new cloud services is ranked higher than an existing one of the cloud services already deployed as part of the aggregated distributed application by deploying the determined one of the new cloud services into the aggregated distributed application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the continuous cognitive discovery and management of cloud services in an aggregated distributed application. In an embodiment of the invention, a textual specification of cloud service criteria is received in a user interface to a cloud services manager and, based upon the textual specification, one or more cloud services are presented in the user interface. The cloud services presented in the user interface are ranked and the ranked cloud services are further presented in the user interface as recommended. One or more of the cloud services are selected for deployment and deployed as part of an aggregated distributed application. Thereafter, new cloud services are discovered based upon the textual specification and ranked. Responsive to a determination that one of the cloud services is ranked higher than an existing cloud service already deployed as part of the aggregated distributed application, the higher ranked cloud service is deployed into the aggregated distributed application as either a supplement to or a replacement for the existing cloud services.

Figure 1:
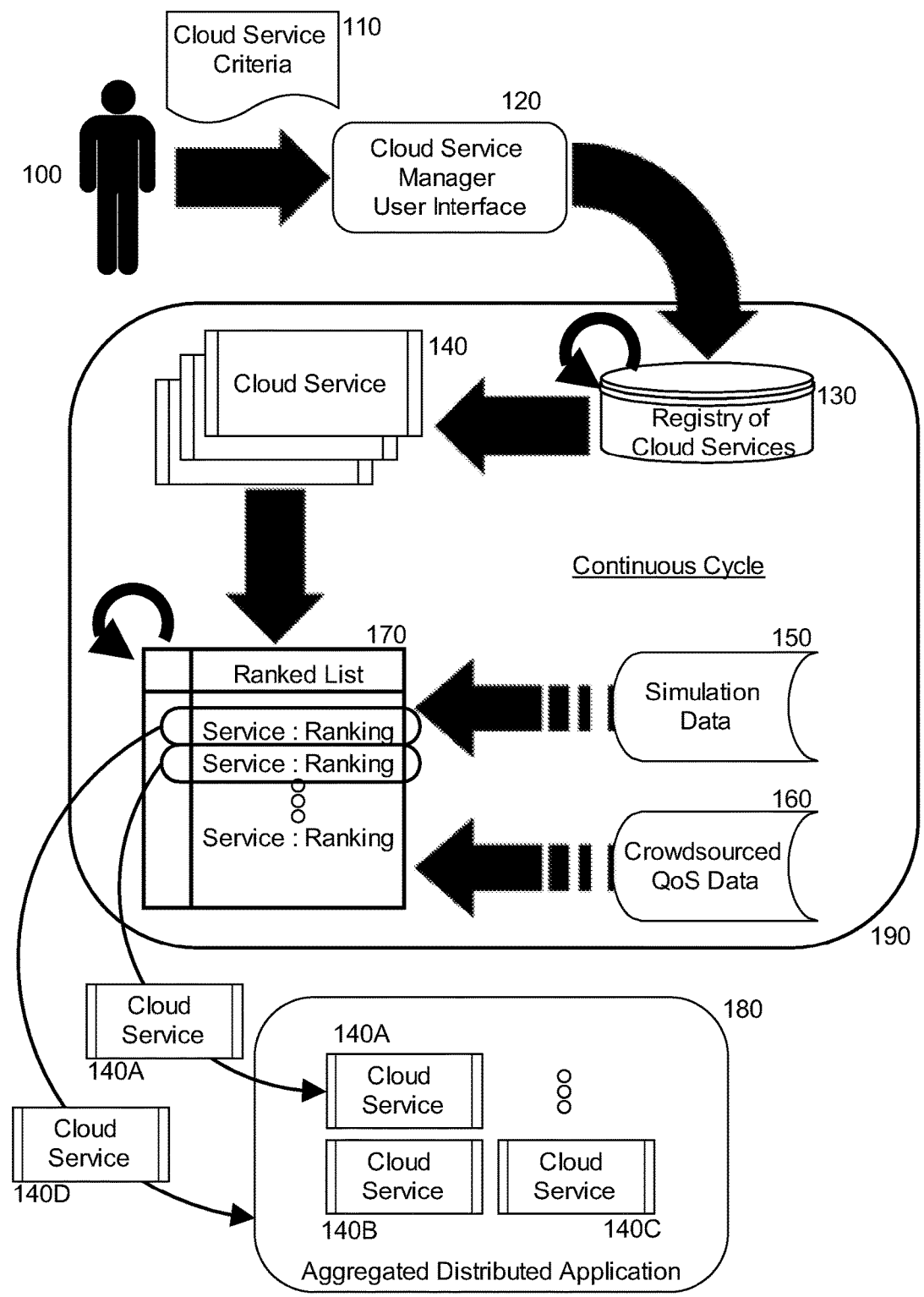
FIG. 1 is a pictorial illustration of a process for the continuous cognitive discovery and management of cloud services in an aggregated distributed application.

In further illustration, FIG. 1 pictorially shows a process for the continuous cognitive discovery and management of cloud services in an aggregated distributed application. As shown in FIG. 1, an end user 100 provides cloud service criteria 110 to a cloud service manager user interface 120. The end user 100 may present the criteria 110 structurally through a form in which different criteria are specified in text fields, radio button fields, drop down boxes and the like, or the end user 100 may present the criteria 110 in free-form and processed using natural language processing. The criteria 110 may include by way of example, situational criteria, functional preferences, location details, risk tolerance and run-time preferences.

Thereafter, cloud service manager 190 searches one or more registries of cloud services 130 (only a single registry shown for simplicity of illustration) for corresponding cloud services 140 matching all or a portion of the cloud service criteria 110. Once cloud service manager 190 locates one or more cloud services 140, based upon the criteria 110, the cloud services manager 190 loads simulation data 150 for the located cloud services 140 that includes performance metrics nominally and under load as well as known performance metrics and performance deviations when combined with others of the located cloud services 140. As well, the cloud services manager 190 loads crowdsourced QoS data 160 for the located cloud services 140.

The cloud services manager 190 then utilizes the simulation data 150 and the crowdsourced QoS data 160 as a basis for ranking the located cloud services 140. In this regard, those of the located cloud services 140 that most closely match the cloud service criteria 110 are ranked higher than more loosely matching ones of the located cloud services 140. Further, those of the located cloud services 140 demonstrating greater performance when in the presence of others of the located cloud services 140 are ranked higher than other ones of the located cloud services 140. Finally, those of the located cloud services 140 demonstrating a higher QoS indicated by the crowdsourced QoS data 160 are ranked higher than other ones of the located cloud services 140. The cloud services manager 190 then presents the ranked ones of the located cloud services 140 in a ranked list 170 in the cloud service manager user interface 120.

The end user 100 selects a combination 140A, 140B, 140C of the located cloud services 140 in the ranked list 170 for deployment as an aggregated distributed application 180. Alternatively, the cloud service manager 190 automatically selects the combination 140A, 140B, 140C of the located cloud services 140 in the ranked list 170 for deployment as an aggregated distributed application 180. Thereafter, the cloud service manager 190 continuously searches the registry 130 with the cloud service criteria 110 to locate cloud services 140. Once located, the cloud service manager 190 continuously utilizes the simulation data 150 and the crowdsourced QoS data 160 to update the ranked list 170.

Periodically, the cloud service manager 190 detects a better ranked cloud service 140D comparable to an existing cloud service 140A already deployed in the aggregated distributed application 180. In that instance, the cloud service manager 190 either replaces the existing cloud service 140A with the better ranked cloud service 140D, or the cloud service manager 190 adds the better ranked cloud service 140D to the aggregated distributed application in supplement to the existing cloud service 140A. The addition or substitution of the better ranked cloud service 140D is performed automatically without intervention by the end user 100, or only with the authorization of the end user 100.

Figure 2:
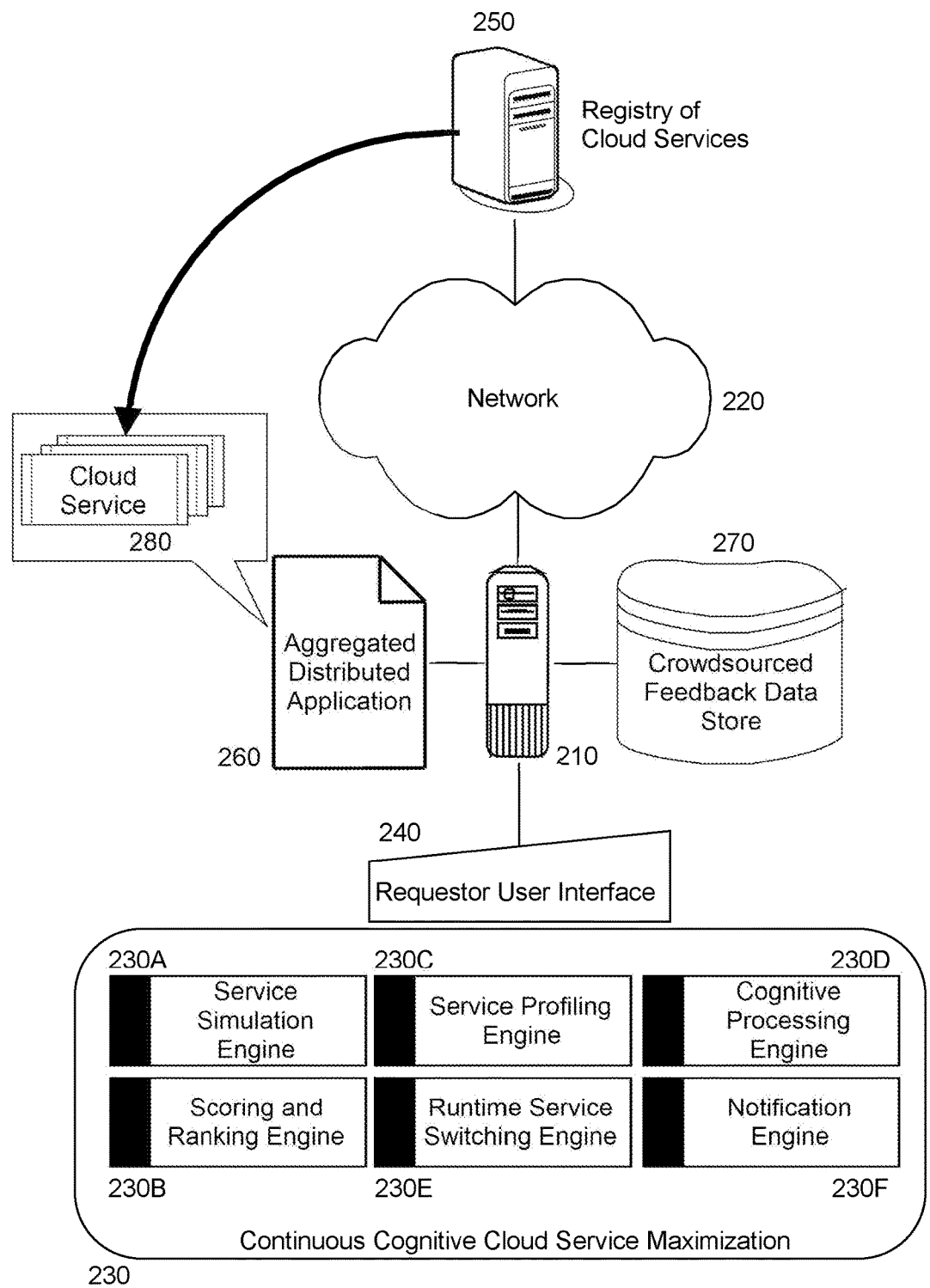
FIG. 2 is a schematic illustration of a data processing system configured for continuous cognitive discovery and management of cloud services in an aggregated distributed application; and, FIG. 3 is a flow chart illustrating a process for the continuous cognitive discovery and management of cloud services in an aggregated distributed application.

The process described in connection with FIG. 1 is implemented in a data processing system. In yet further illustration, FIG. 2 schematically shows a data processing system configured for continuous cognitive discovery and management of cloud services in an aggregated distributed application. The system includes a host computing platform 210 with one or more computers, each with memory and at least one processor. A continuous cognitive cloud service maximization module 230 executes in the memory of the host computing platform 210 that includes each of a service simulation engine 230A, a scoring and ranking engine 230B, a service profiling engine 230C, a cognitive processing engine 230D, a runtime service switching engine 230E and a notification engine 230F. As well, the continuous cognitive cloud service maximization module 230 provides a requestor user interface 240 to the continuous cognitive cloud service maximization module 230.

The requestor user interface 240 receives input from a requestor whether textually or audibly, the input defining one or more criteria for cloud services 280 to be aggregated into a composite application 260. The input may include functional requirements of the cloud services 280, as well as performance and risk tolerance for QoS of the cloud services 280 or the input may be received through simply data entry, through more complex menu/dialog-driven responses. The menu/dialog associated with the menu/dialog-driven responses may be configured through the use of ontology and context learned from the cognitive processing engine 230D based upon previous requests and available cloud services along with any data associated with the cloud services. Optionally, an artificial intelligence (AI) component with natural language processing (NLP) is included to process the user input in real time so as to derive situational functional requirements, preferences, current location, risk tolerance and runtime requirements of the cloud services. Furthermore, the AI-NLP may interface with the cognitive processing engine 230D to retrieve previous ontologies, requirements, dependencies and context in order to assist in the prompting of end users in the form of dialog/menu-driven guidance during the process of inputting requirements and preferences.

The cognitive processing engine 230D itself performs pattern analysis, formulates the ontologies, derives the context, compares current and previous requirements, and determines and analyzes cloud service dependencies. The cognitive processing engine 230D continuously learns and stores knowledge gained from end user requirements and requester profiles, service details from the service profiling engine 230C, as well as results from simulations run in the service simulation engine 230A. More particularly, the requestor profiles store current and past requester requirements that reflect ontologies that have been derived, any context that drives functional and non-functional requirements of a corresponding cloud service, different dependencies of the cloud services, all of are received in the requester user interface 240. The requestor profiles also store notification preferences that include when, how and how often an end user is to be notified with respect to cloud service performance metrics and thresholds, or availability of new cloud services, and whether or not service switching from one cloud service to another in the aggregated distributed application 260 has occurred.

The service profiling engine 230C catalogs and stores all data relating to the cloud services 280 including published metadata, discovered groupings and patterns of services, runtime and historical usage metrics, as well as all crowdsourced QoS feedback in data store 270, rating and compliance data. The service profiling engine 230C continuously crawls Internet sources to discover and collect this data from both known, existing and also new sources, including the registry 250. The service profiling engine 230C provides access to the stored data to the cognitive processing engine 230D for marriage to respective ones of the requester profiles. Consequently, the collected data then is utilized by the service simulation engine 230A.

More specifically, the service simulation engine 230A continuously evaluates prospective new ones of the cloud services 280 for inclusion in the aggregated distributed application 260 by simulating the operation of each of the prospective new cloud services 280. In order to evaluate prospective new cloud services 280 in various combinations to determine the viability and performance of the each of the prospective new ones of the cloud services 280 against a given set of requirements, the service simulation engine 230A evaluates different combinations of the prospective new ones of the cloud services 280 in a virtualized runtime environment in order to observe and store performance metrics, deviations, as well as compliance and risks, and output from load testing and unit testing against related use cases. During this simulation, the service simulation engine 230A evaluates and stores the various combinations, including situations where the interface, schema and application programming interface (API) of two comparable ones of the prospective cloud services 280 are not identical. This allows the service simulation engine 230A to identify, and if possible, rectify any deviations that are required to accommodate a prospective new one of the cloud services 280 when connecting with one of two alternate other ones of the cloud services 280.

Scoring and ranking engine 230B evaluates the data and results from the service simulation engine 230A about the different new prospective cloud services 280 and the various combinations thereof against a given requester profile as well as data from the service profiling engine 230C in order to calculate a scoring/ranking that includes: (A) a compliance and risk score, (B) a matching score, (C) an evaluation result, and (D) an alternative candidate one of the cloud services 280 that might be considered. Optionally, the scoring and ranking engine 230 ranks a combination of prospective new ones of the cloud services 280 as an equivalent to a single other one of the cloud services 280 in consideration of a particular set of requestor requirements specified in corresponding criteria.

Runtime service switching engine 230E reacts to information relevant to a deployed one of the cloud services 280 in the aggregated distributed application 260, including data produced by the service simulation engine 230A or data produced by the cognitive processing engine 230D, by selecting a comparable but better ranked one of the cloud services 280 to replace or supplement the the deployed one of the cloud services 280 in the aggregated distributed application 260. The runtime service switching engine 230 automatically replaces or supplements the deployed one of the cloud services 280, or in the alternative, prompts an end user to approve the replacement or supplement of the deployed one of the cloud services 280.

Finally, the notification engine 230F communicates with a requestor based upon requestor specified preferences that include preferred transmission channels for receiving notifications and a frequency or trigger for receiving notifications. Typical triggers may include when a measured metric falls below a required threshold, when a new cloud service is evaluated to be a viable alternative to an existing, deployed one of the cloud services 280, when service switching has occurred, or is recommended, periodically, or when new data is available such as new crowdsourced feedback in the data store 270 that might affect the scoring and therefore ranking or QoS of a corresponding one of the cloud services 280.

Figure 3:
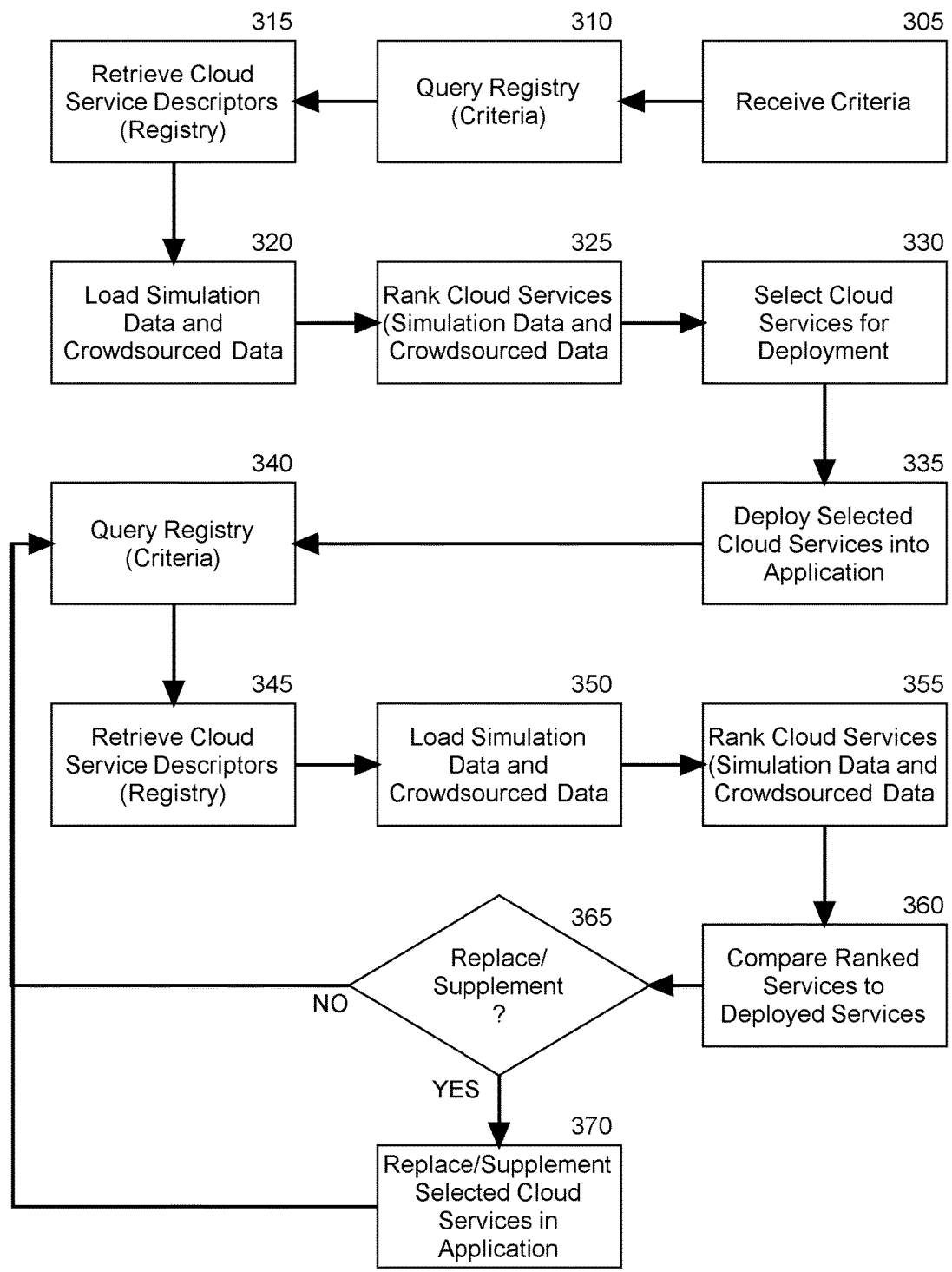

In even yet further illustration of the operation of the continuous cognitive cloud service maximization module 230, FIG. 3 is a flow chart illustrating a process for the continuous cognitive discovery and management of cloud services in an aggregated distributed application. Beginning in block 305, the requestor user interface receives cloud service criteria and in block 310, the cloud services manager queries one or more cloud service registries with the criteria in order to identify one or more corresponding cloud services able to be deployed into an aggregated distributed application. In block 315, the cloud service manager retrieves from the one or more registries different service descriptors for the different located cloud services.

In block 320, the cloud services manager loads simulation data and crowdsourced QoS data for the located cloud services and in block 325, each of the located cloud services are ranked based upon the simulation data and the crowdsourced QoS data and in block 330, the cloud services manager selects different ones of the ranked cloud services for inclusion in an aggregated distributed application. Thereafter, in block 335 the cloud services manager deploys the selected ones of the ranked cloud services as part of the aggregated distributed application. Finally, a continuous cycle of refinement of the cloud services deployed in the aggregated distributed application commences.

With respect to the continuous cycle of refinement, in block 340, the cloud services manager queries one or more of the registries once again based upon the cloud services criteria. In block 345, once again the cloud services manager receives different descriptors for different corresponding cloud services meeting at least a portion of the criteria and in block 350, the cloud services manager loads simulation data and crowdsourced QoS data for the different corresponding cloud services. In block 355, the cloud services manager re-ranks the cloud services in consideration of the simulation data and the crowdsourced QoS data for the different corresponding cloud services and then, in block 360 the cloud services manager compares the newly re-ranked cloud services to those cloud services already deployed in the aggregated distributed application.

In decision block 365, if the cloud services manager determines that an existing one of the cloud services already deployed in the aggregated distributed application is subject to replacement or supplement by one of the newly re-ranked cloud services, the cloud services manager initiates runtime service switching with respect to the newly re-ranked cloud services in the aggregated distributed application.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A data processing system configured for the continuous cognitive discovery and management of cloud services in an aggregated distributed application, the system comprising:
   a host computing platform comprising one or more computers, each with memory and at least one processor, the host computing platform being communicatively coupled over a computer communications network to multiple different repositories of different cloud services and also to at least one registry of the different cloud services; and,
   a cloud services management module executing in the memory of the host computing platform, the module comprising program code enabled during execution in the memory of the host computing platform to:
   receive in a user interface to the module a textual specification of cloud service criteria;
   search the registry for cloud services corresponding to the textual specification and presenting in the user interface locating cloud services corresponding to the textual specification;
   rank the located cloud services and present the rankings for the located cloud services in the user interface;
   select one or more of the cloud services presented in the user interface for deployment and deploy the selected cloud services as part of an aggregated distributed application; and,
   subsequent to the deployment of the selected cloud services, search the registry to locate new cloud services based upon the textual specification, rank located new cloud services, and respond to a determination that one of the located new cloud services is ranked higher than an existing one of the cloud services already deployed as part of the aggregated distributed application by deploying the determined one of the new cloud services into the aggregated distributed application.

2. The system of claim 1, wherein the determined one of the new cloud services is deployed into the aggregated distributed application in substitute for the existing one of the cloud services.

3. The system of claim 1, wherein the determined one of the new cloud services is deployed into the aggregated distributed application in supplement to the existing one of the cloud services.

4. The system of claim 1, wherein the ranking is based upon crowdsourced feedback of quality of service (QoS) from different users of the cloud services.

5. The system of claim 1, wherein the ranking for a corresponding one of the cloud services is based upon a measured result of simulated performance of the corresponding one of the cloud services.

6. The system of claim 1, wherein the searching of the registry to locate new cloud services based upon the textual specification, and the ranking of the located new cloud services occurs continuously.

7. A computer program product for the continuous cognitive discovery and management of cloud services in an aggregated distributed application, the computer program product comprising a computer readable storage device having program instructions embodied therewith, the program instructions executable by a device to cause the device to perform a method comprising:
   receiving in a user interface to a cloud services manager, a textual specification of cloud service criteria;
   searching a registry for cloud services corresponding to the textual specification and presenting in the user interface locating cloud services corresponding to the textual specification;
   ranking the located cloud services and presenting the rankings for the located cloud services in the user interface;
   selecting one or more of the cloud services presented in the user interface for deployment and deploying the selected cloud services as part of an aggregated distributed application; and,
   subsequent to the deployment of the selected cloud services, searching the registry to locate new cloud services based upon the textual specification, ranking located new cloud services, and responsive to a determination that one of the located new cloud services is ranked higher than an existing one of the cloud services already deployed as part of the aggregated distributed application, deploying the determined one of the new cloud services into the aggregated distributed application.

8. The computer program product of claim 7, wherein the determined one of the new cloud services is deployed into the aggregated distributed application in substitute for the existing one of the cloud services.

9. The computer program product of claim 7, wherein the determined one of the new cloud services is deployed into the aggregated distributed application in supplement to the existing one of the cloud services.

10. The computer program product of claim 7, wherein the ranking is based upon crowdsourced feedback of quality of service (QoS) from different users of the cloud services.

11. The computer program product of claim 7, wherein the ranking for a corresponding one of the cloud services is based upon a measured result of simulated performance of the corresponding one of the cloud services.

12. The computer program product of claim 7, wherein the searching of the registry to locate new cloud services based upon the textual specification, and the ranking of the located new cloud services occurs continuously.

* * * * *